(12) United States Patent
Rivera et al.

(10) Patent No.: US 10,019,163 B2
(45) Date of Patent: Jul. 10, 2018

(54) POLICY BASED STORAGE IN A HETEROGENEOUS STORAGE ENVIRONMENT

(71) Applicant: VMware, Inc., Palo Alto, CA (US)

(72) Inventors: Rawlinson Rivera, Los Angeles, CA (US); Chen Wei, Milpitas, CA (US); Sudarsana R Piduri, Campbell, CA (US)

(73) Assignee: VMWARE, INC, Palo Alto, CA (US)

( * ) Notice: Subject to any disclaimer, the term of this patent is extended or adjusted under 35 U.S.C. 154(b) by 67 days.

(21) Appl. No.: 15/195,315

(22) Filed: Jun. 28, 2016

(65) Prior Publication Data

US 2017/0371546 A1    Dec. 28, 2017

(51) Int. Cl.
*G06F 3/06* (2006.01)
*G06F 9/455* (2018.01)

(52) U.S. Cl.
CPC .......... *G06F 3/0604* (2013.01); *G06F 3/0664* (2013.01); *G06F 3/0673* (2013.01); *G06F 9/45558* (2013.01); *G06F 2009/45579* (2013.01)

(58) Field of Classification Search
None
See application file for complete search history.

(56) References Cited

U.S. PATENT DOCUMENTS

2005/0022201 A1*  1/2005  Kaneda ................. G06F 3/0604
                                               718/104

* cited by examiner

*Primary Examiner* — Midys Rojas

(57) ABSTRACT

A method and apparatus in a virtualization system may include using a storage policy that defines a storage characteristic to specify a datastore. The storage policy may be used to identify candidate datastores. A datastore may be selected from the candidates. The datastore can therefore be identified without the user having to identify the datastore directly, but rather indirectly by way of a storage characteristic defined by a storage policy.

24 Claims, 10 Drawing Sheets

POLICY BASED STORAGE IN A HETEROGENEOUS STORAGE ENVIRONMENT

BACKGROUND

Virtualization can refer to the process of creating a virtual, rather than physical, version of a computing system. Virtualization uses software to simulate the existence of hardware and create an environment of virtual computer systems. Establishing a virtualization environment allows an enterprise to run several virtual systems on a small number physical hosts, which can provide economies of scale and greater efficiency.

Over time, a virtualization system in an enterprise may accumulate a number of heterogeneous storage platforms. This may be because of acquisitions, technology refresh, for price reasons, and so on. However, each storage platform comes with its own storage capabilities. Consuming such platforms can be very challenging since there is usually no terminology common to all of the storage platforms. For example, there is no consistent way for an administrator of the virtualization system to specify capability at a high level; for example, requiring a certain number of I/O operations per second (IOPs), requiring that data always encrypted, and so on.

The challenge becomes even greater after initial placement of a virtual machine (VM) in an active virtualization system where there can be many (tens, to hundreds, to thousands) VMs deployed in the enterprise. With each VM having at least one datastore and sometimes more than one datastore associated with it, ensuring that these deployed datastores are in compliance with their respective storage policies over the lifetime of the VM can be a complex and time consuming effort.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
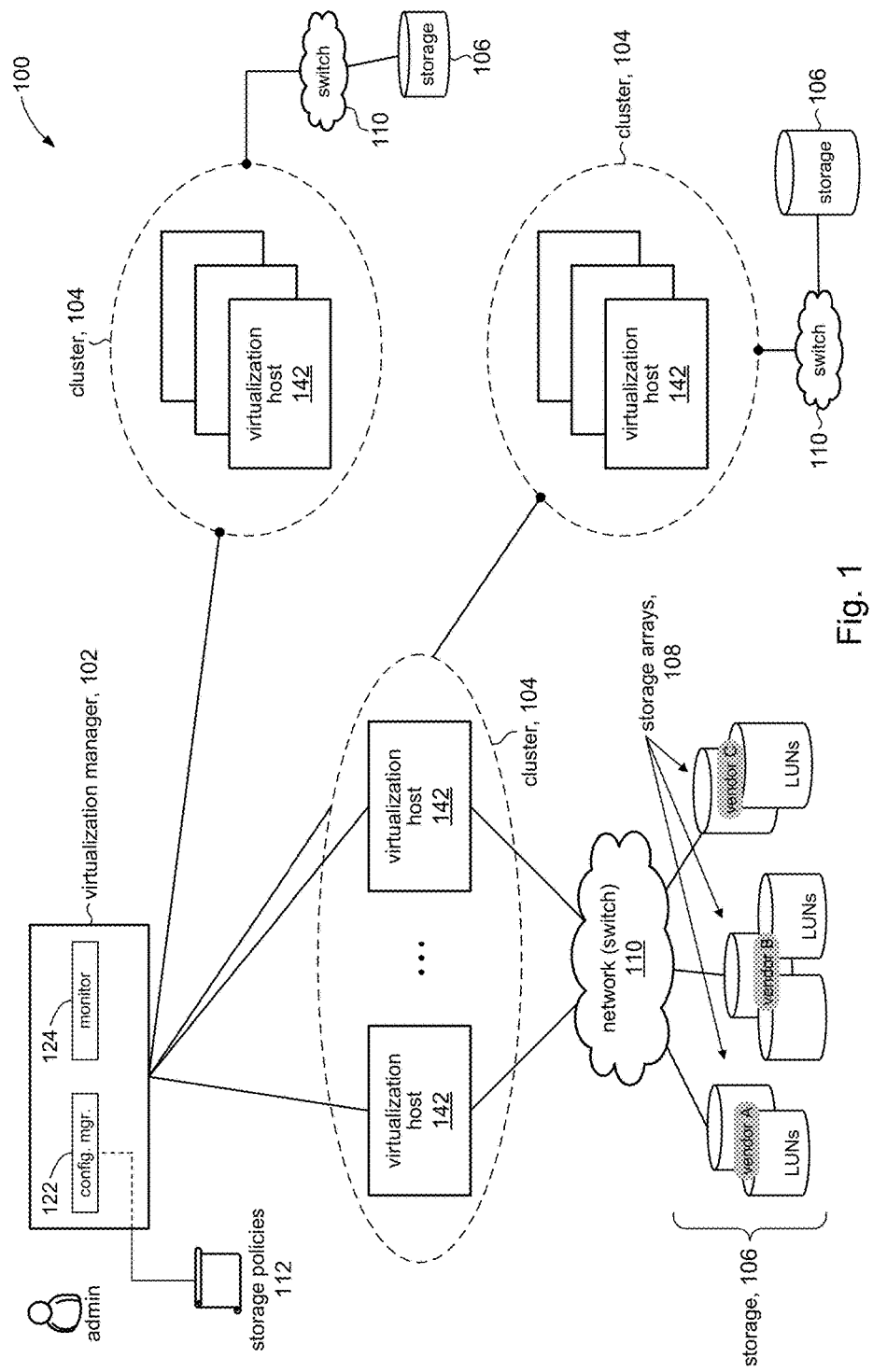
FIG. 1 illustrates a virtualization system adapted in accordance with the present disclosure.

FIG. 1 depicts an illustrative example of a virtualization system 100 in accordance with the present disclosure. In some embodiments, the virtualization system 100 may include a virtualization manager 102 to manage virtualization hosts (host machines) 142. The hosts 142 in turn may be organized into one or more clusters 104. Each cluster 104 may be associated with a respective storage system 106 and a communication network comprising one or more switches 110 to provide control and data communication between the cluster 104 and its respective storage system 106. The number of hosts 142 (and clusters 104) and storage systems 106 will vary from one deployment of virtualization system 100 to another. For example, an enterprise may deploy tens to hundreds of hosts 142 and tens to hundreds to thousands of storage systems 108 to support the various operations in the enterprise.

Each storage system 106 may comprise one or more storage arrays 108. A storage array 108 may comprise one or more disk drive units (e.g., hard disk drives, HDDs). Storage arrays 108 may be based on different storage technologies such as storage area networks (SANs), Fibre Channel SANs, Internet SCSI (iSCSI), network-attached storage (NAS), and so on. The disk drive units in a storage array 108 may be logically partitioned into logical units (LUNs) or File System Volumes (FSVs). LUNs and FSVs can be defined on a portion of an HDD (an HDD may have several LUNs/FSVs defined on it). LUNs and FSVs can be defined on an entire HDD, on one or more HDDs, or even the full storage array. The term LUN typically means that the storage provided by the constituent disk drive unit(s) does not have any predefined structure. By comparison, an FSV means a file system is defined on the constituent disk drive unit(s). As used herein, the reference to "LUN" will be understood to refer to LUNs, FSVs, or both.

Each LUN defined in a given storage array 108 can be configured according to the storage capabilities that the given storage array 108 has. Different LUNs in a given storage array 108 may be configured differently. For example, one LUN may be configured (e.g., via a controller in the storage array) to operate at a maximum of 2000 I/O operations per second (IOPs), while another LUN may be able to provide 10000 IOPs, and so on for the other LUNs.

A storage system 106 may comprise a single storage array 108. In some embodiments, the storage system 106 may comprise a homogeneous collection of several storage arrays 108; e.g., each storage array 108 is supplied by the same storage provider (vendor). In other embodiments, the storage system 106 may comprise a heterogeneous collection of several storage arrays 108. FIG. 1, for example, shows an example of a storage system 106 comprising storage arrays 108 from different storage providers; e.g., vendor A, vendor B, vendor C.

Each host 142 may comprise physical hardware (CPU, memory, hard disk storage, etc.) and computer software and/or firmware to support the execution of virtual machines. A virtual machine (VM) is a software computer that, like a physical computer, runs an operating system (guest OS) and applications. Each VM may comprise its own software-based (virtual) hardware, including a virtual CPU, virtual memory, virtual disk, and so on. Software called the hypervisor (virtual machine monitor, VMM) may execute on the physical hardware of the host 142, and act as a platform for the VMs. The hypervisor allows VMs to run independently of the underlying physical hardware. For example, a VM can be moved from one physical host to another, or its virtual disks can be moved from one type of storage to another, without affecting the functioning of the VM. An example of a host 142 is the VMware ESXi™ hypervisor product developed and sold by VMware, Inc. for deploying and supporting the execution of VMs.

The virtualization manager 102 may include a configuration manager 122 configured to manage the configuration of VMs in the virtualization system 100. For example, the vCenter™ application is a management tool developed and sold by VMware, Inc. that allows a user (e.g., system administrator) to manage several host machines via a user interface (UI). The configuration manager 122 may include a UI that allows the user to provision (define) VMs, which may then be later deployed in the virtualization system 100. In some embodiments, the configuration manager 122 may include a UI that allows a user to re-configure previously defined VMs; for example, a VM may be re-configured to add or remove a virtual disk.

In accordance with the present disclosure, the virtualization system 100 may define storage policies 112 to unify storage capabilities that can be configured among the various storage arrays 108 that comprise the virtualization system 100 into easily consumable entities. This can be useful in a mature system where the virtualization system 100 may comprise a heterogeneous collection of storage arrays 108. Storage policies 112 may be defined to abstract storage capabilities from among the different storage arrays 108. This aspect of the present disclosure is discussed in more detail below.

In accordance with the present disclosure, the configuration manager 122 may use storage policies 112 to specify a characteristic of the datastores that contain the virtual disks of a VM. Storage policies 112 may be used to identify datastores during provisioning of a VM, during execution of a deployed VM, or when reconfiguring a deployed VM. These aspects of the present disclosure are described in more detail below.

The virtualization manager 102 may include a storage monitor 124 configured to monitor the performance of the virtual disks of a VM, and in particular the one or more datastores that contain the virtual disks. In accordance with the present disclosure, the storage monitor 124 may assess the performance of the datastores for compliance with respective storage policies 112 associated with the corresponding VMs. In accordance with the present disclosure, when non-compliance is detected, the storage monitor 124 may take remedial action to replace the non-compliant datastore. This aspect of the present disclosure is described in more detail below.

Figure 2:
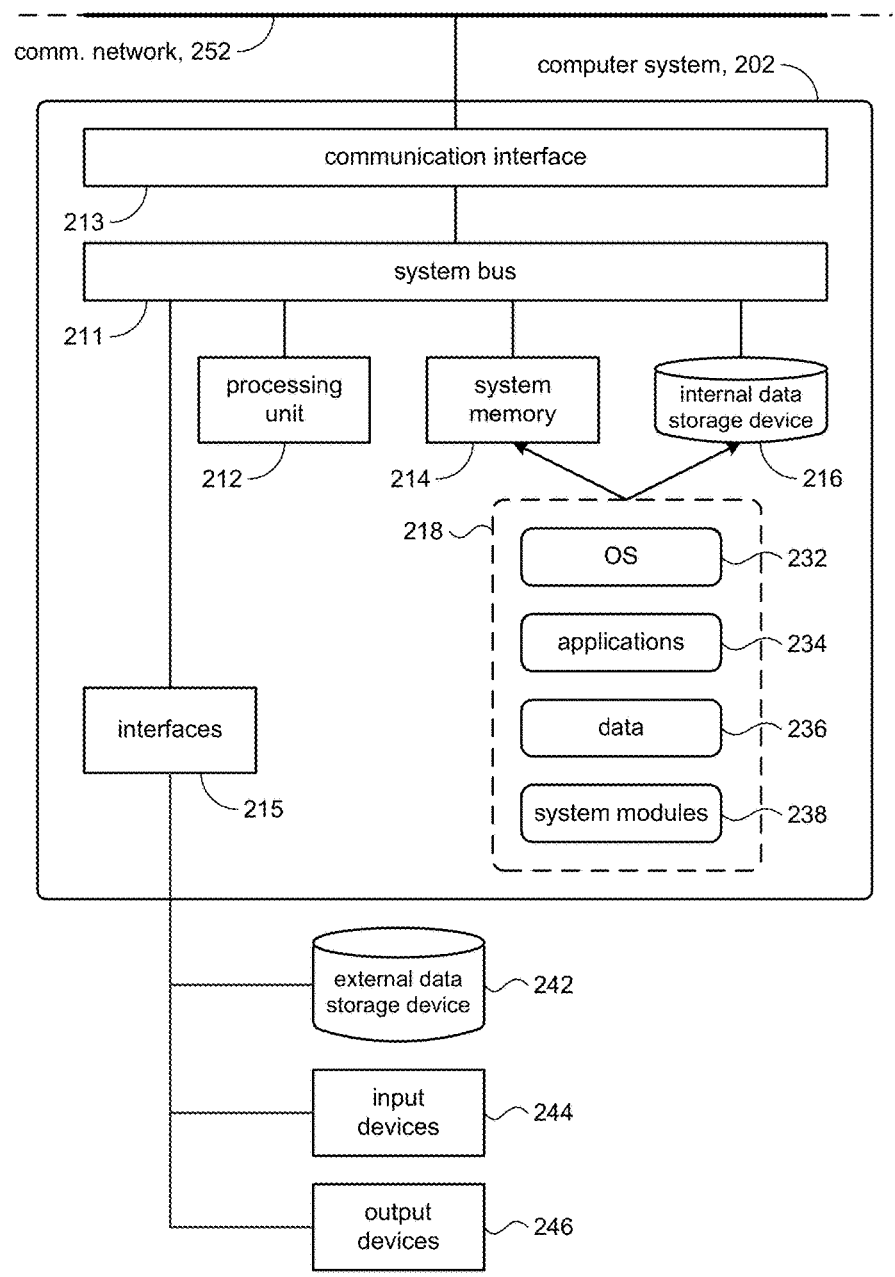
FIG. 2 illustrates a computer system adapted in accordance with the present disclosure.

FIG. 2 shows an example of a computer system 202 that can be adapted for the virtualization system 100 and for the hosts 142 in various embodiments of the present disclosure. The computer system 202 may include a processing unit 212, a system memory 214, and a system bus 211. The system bus 211 may connect various system components including, but not limited to, the processing unit 212, the system memory 214, an internal data storage device 216, and a communication interface 213.

In some embodiments, the processing unit 212 may be a single-processor configuration. In other embodiments, the processing unit 212 may comprise a multi-processor architecture. The system memory 214 may include read-only memory (ROM) and random access memory (RAM). The internal data storage device 216 may be an internal hard disk drive (HDD), a magnetic floppy disk drive (FDD, e.g., to read from or write to a removable diskette), an optical disk drive (e.g., for reading a CD-ROM disk, or to read from or write to other high capacity optical media such as the DVD, and so on).

The internal data storage device 216 and its associated non-transitory computer-readable storage media may provide nonvolatile storage for data, data structures, computer-executable instructions, and so forth. Although the description of computer-readable media above refers to an HDD, removable magnetic diskette, and removable optical media such as a CD or DVD, it is noted that other types of media which are readable by a computer, such as zip drives, magnetic cassettes, flash memory cards, cartridges, and the like, may also be used. In addition, any such media may contain computer-executable instructions for performing the methods disclosed herein.

The system memory 214 and/or the internal data storage device 216 may store various program and data modules 218, including for example, an OS 232, one or more application programs 234 (e.g., configuration manager 122, storage monitor 124, FIG. 1), program data 236 (e.g., storage policies 112, FIG. 1), and other program/system modules 238. In accordance with the present disclosure, for example, the configuration manager 122 and the storage monitor 124, each, may comprise computer executable program code, which when executed may cause the computer system 202 to perform the various steps disclosed herein. An external data storage device 242 may be connected to the computer system 202.

Access to the computer system 202 may be provided by a suitable input device 244 (e.g., keyboard, mouse, touch pad, etc.) and a suitable output device 246, (e.g., display screen). In a configuration where the computer system 202 is a mobile device, input and output may be provided by a touch sensitive display.

The computer system 202 may operate in a networked environment using logical connections via wired and/or wireless communications to one or more remote computers (not shown) over a communication network 252. The communication network 252 may be a local area network (LAN) and/or larger networks, such as a wide area network (WAN).

Figure 3:
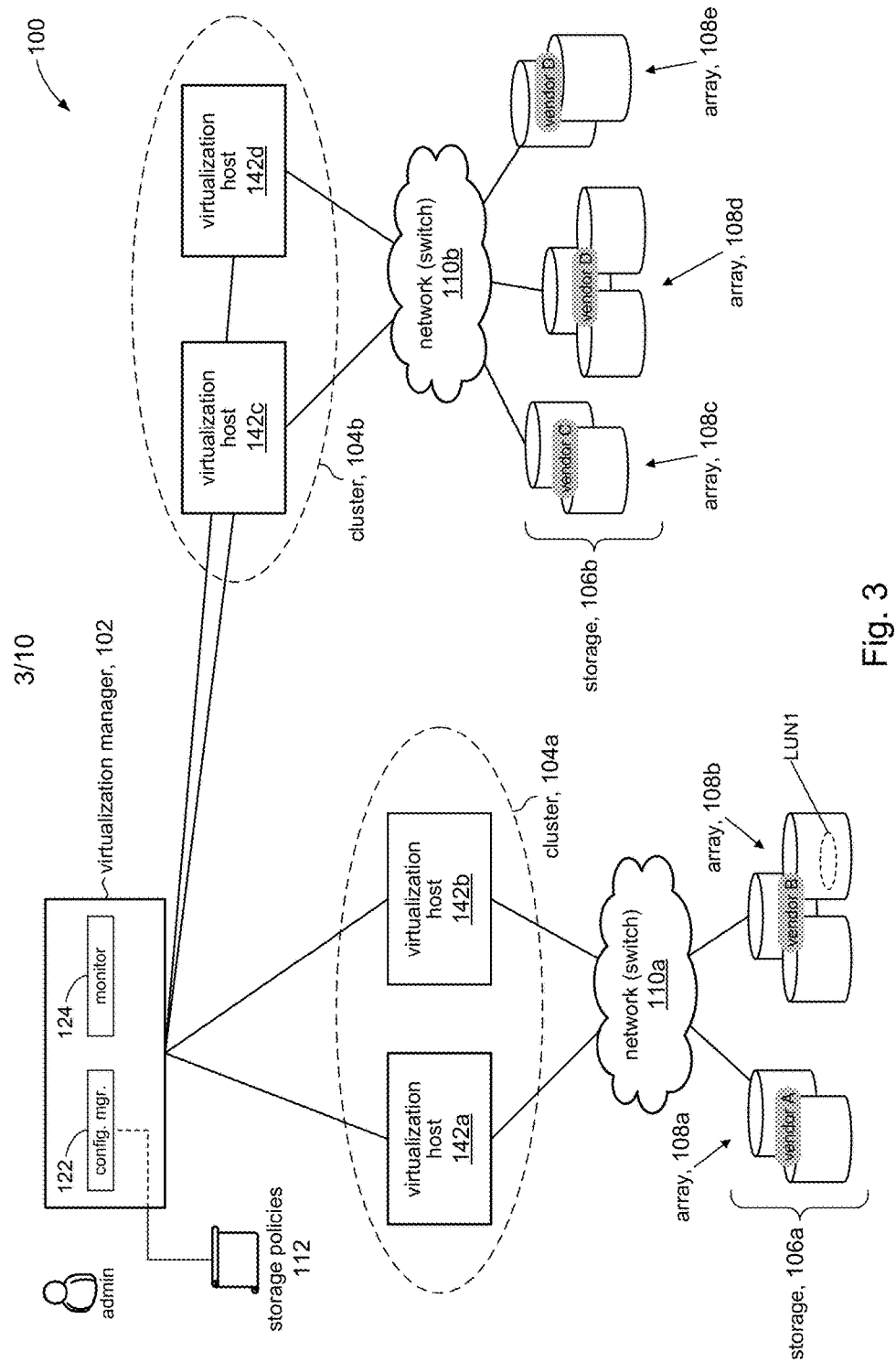
FIG. 3 shows an illustrative configuration of a virtualization system adapted in accordance with the present disclosure for the purpose of explaining processing in accordance with the present disclosure.

The discussion will now turn to a description of processing in the configuration manager 122 in accordance with the present disclosure. Reference is made to FIG. 3, which depicts a specific configuration of virtualization system 100 merely as an illustrative example to support the discussion. The configuration shown in FIG. 3 includes two clusters 104a, 104b. Cluster 104a includes hosts 142a, 142, and cluster 104b includes hosts 142c, 142d. Cluster 104a is associated with storage system 106a, which comprises a storage array 108a from vendor A and a storage array 108b from vendor B storage disks. Switch 110a provides communication between cluster 104a and storage system 106a.

Cluster 104*b* is associated with storage system 106*b*, which comprises a storage array 108*c* from vendor C. Storage system 106*b* illustrates that a storage system may comprise two different kinds of storage arrays 108*c*, 108*d* from the same vendor D. Switch 110*b* provides communication between cluster 104*b* and storage system 106*b*. Though not illustrated in FIG. 3, each storage array 108*a*-108*e* may be partitioned into several LUNs.

Figure 4:
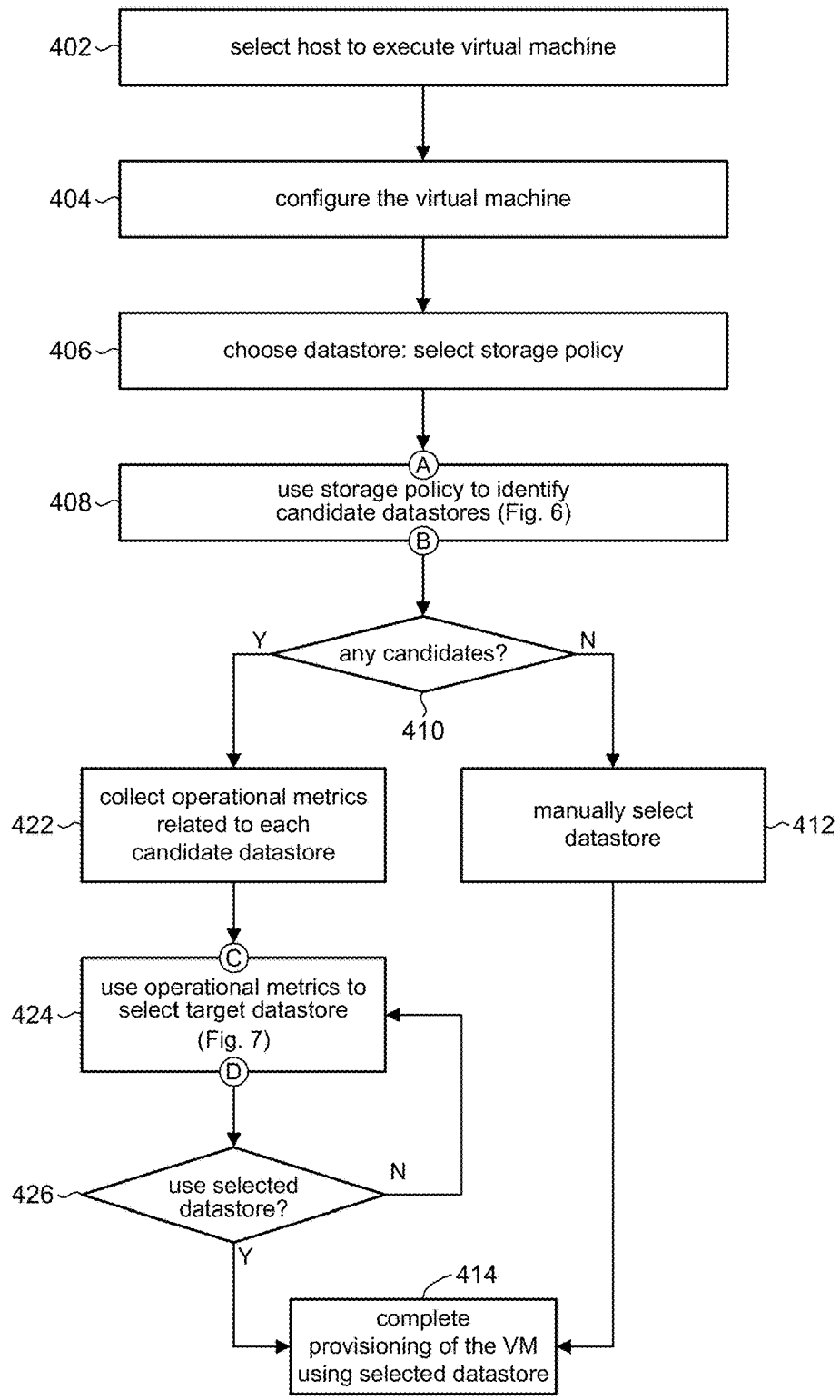
FIG. 4 highlights some aspects of provisioning a virtual machine in accordance with the present disclosure.

Referring to FIG. 4, and with reference to FIG. 3, the discussion will now turn to a high level description of some heuristics that can serve to represent processing in the configuration manager 122 to provision a VM in accordance with the present disclosure. In some embodiments, for example, the configuration manager 122 may include computer executable program code, which when executed by a computer system (e.g., 202, FIG. 2), may cause the computer system to perform the processing in accordance with FIG. 4.

At block 402, the configuration manager 122 may interact with a user (e.g., a system administrator) to select a host 142*a*-142*d* to host (execute) the VM. Depending on the configuration of the virtualization system 100, in some embodiments, the user may identify a specific host (e.g., host 142*c*). In other embodiments, the user may specify only a cluster (e.g., 104*a*), leaving the configuration manager 122 to choose a host 142*a*, 142*b*, and so on.

At block 404, the configuration manager 122 may interact with the user to specify a configuration of the VM. For example, the user may configure the VM with various virtual hardware, such as a CPU or multiple CPUs, I/O adapters, virtual memory, and so on. The user may select which operating system (guest OS) to install on the VM. The user may configure the VM to have a virtual disk or several virtual disks.

At block 406, the configuration manager 122 may interact with the user to choose one or more datastores to contain or otherwise store the VM's files, including the VM's virtual disks. A datastore is generally a repository for persistently storing collections of data, such as a database, a file system or a directory, and so on. The VM comprises a set of files stored in these datastores. For example, the virtual disks of the VM may actually be a directory in a file system defined in a datastore. In some embodiments, a datastore may be created or defined on a specific LUN (e.g., LUN1) in a particular storage array (e.g., 108*b*). A datastore may be defined across several LUNs. In other embodiments, several datastores may be defined on a single LUN. In some configurations, a VM may be associated with a single datastore that stores all the files (including the virtual disk) that comprise the VM. In other configurations, a VM may be configured with multiple virtual disks, which may be stored on multiple datastores; e.g., one virtual disk on each datastore.

In accordance with the present disclosure, the configuration manager 122 may allow the user to specify a datastore in terms of a storage characteristic desired of that datastore. For example, the user may want a datastore that has backup capability, or a datastore that can guarantee a certain level of I/O performance (e.g., low latency, minimum I/O operations per second, etc.), and so on. In some embodiments, the configuration manager 122 may provide a list of storage policies 112 that specify different such storage characteristics. The storage policy 112 can allow a user to configure a VM according to a specified level of storage service by selecting a suitable storage policy 112. For example, if the service level calls for encryption, the user may select a storage policy 112 that specifies encryption. If the service levels calls for high data throughput, the user may select a storage policy 112 that specifies some form of I/O performance, and so on.

At block 408, the configuration manager 122 may use the selected storage policy to identify candidate datastores from among the storage arrays 108 deployed in the virtualization system 100. In accordance with some embodiments of the present disclosure, the candidate datastores refer to the LUNs that are defined in those storage arrays 108. This aspect of the present disclosure is discussed in further detail below in connection with FIG. 6. The entry points A and B shown in FIG. 4 correspond to entry points A and B shown in FIG. 6. In accordance with some embodiments of the present disclosure, the configuration manager 122 may operate in autonomous fashion (without further input from the user, or further interaction with the user) to identify the candidate datastores.

At block 410, if no candidate datastores are found, the configuration manager 122 may proceed to block 412, where the configuration manager 122 may interact with the user to allow the user to manually select one or more datastores. The configuration manager 122 may then proceed to block 414 to complete the provisioning process with the selected datastore(s).

If at block 410, one or more candidate datastores were identified at block 408, the configuration manager 122 may select one of the candidate datastores in order to complete the provisioning process (block 414). Accordingly, at block 422, in accordance with the present disclosure, the configuration manager 122 may collect operational metrics relating to the performance for each datastore in the list of candidate datastores identified at block 408. Operational metrics may be collected during the operation of storage arrays 108*a*-108*e* deployed in the virtualization system 100. In some instances, for example, the storage arrays 108*a*-108*e* may collect and manage their own operational metrics. The switches 110*a*, 110*b* may monitor and store certain operational metrics, and likewise the hosts 142*a*-142*d* may collect some operational metrics. In some embodiments, the configuration manager 122 may query the hosts 142*a*-142*d*, switches 110*a*, 110*b*, and storage systems 106*a*, 106*b* for operational metrics. In other embodiments, the virtualization manager 102 may collect and store some operational metrics that the configuration manager 122 can access. In accordance with some embodiments, the configuration manager 122 may identify operational metrics in a given storage array 108*a*-108*e* that relate to any candidate datastore(s) created in that storage array 108*a*-108*e*.

At block 424, the configuration manager 122 may select a datastore from among the candidate datastores using the operational metrics collected at block 422. This aspect of the present disclosure is discussed in further detail below in connection with FIG. 7. The entry points C and D shown in FIG. 4 correspond to entry points C and D shown in FIG. 7. In accordance with some embodiments of the present disclosure, the configuration manager 122 may operate in autonomous fashion (without further input from the user, or further interaction with the user) to select the datastore.

At block 426, the configuration manager 122 may present to the user the selected datastore. Since the datastore may be autonomously selected, the configuration manager 122 may allow the user may make the final decision whether to accept the selection (YES branch) or deny the selection (NO branch). If the selection is denied, the configuration manager 122 may repeat the process by making another selection (block 424) from among the candidate datastores. If the selection is accepted, processing may proceed to block 414 to complete the provisioning of the VM using the automatically selected datastore.

As can be appreciated, the user's VM provisioning activities in accordance with the present disclosure can be facilitated by the use storage policies. The user need not search the storage systems 106a, 106b deployed in the virtualization system 100 to identify a suitable datastore. Rather, the user need only specify a storage policy 112 that satisfies a desired or required storage characteristic of the datastore. The configuration manager 122 can then identify a specific suitable datastore, thus alleviating the user of a task that can be overwhelming, especially in an enterprise setting where than can be hundreds to thousands for differently configured datastores created among tens to hundreds of storage arrays.

Figure 5:
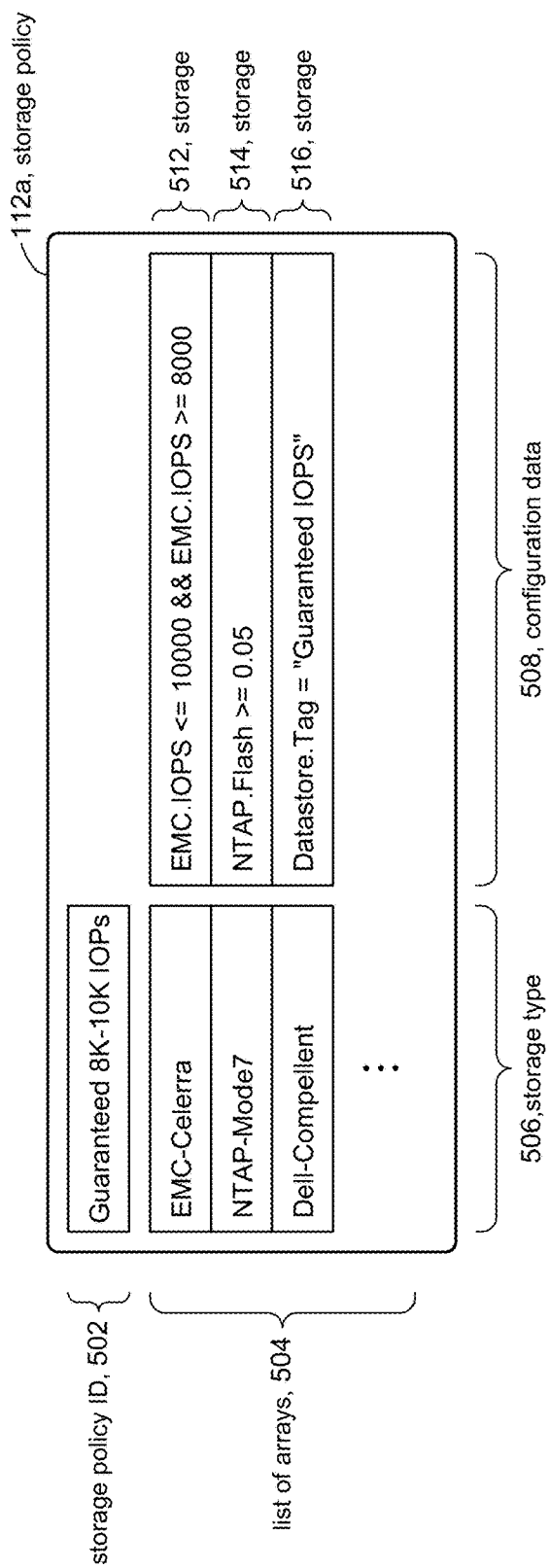
FIGS. 5 and 5A illustrate examples of a storage policy in accordance with the present disclosure.
Figure 5A:
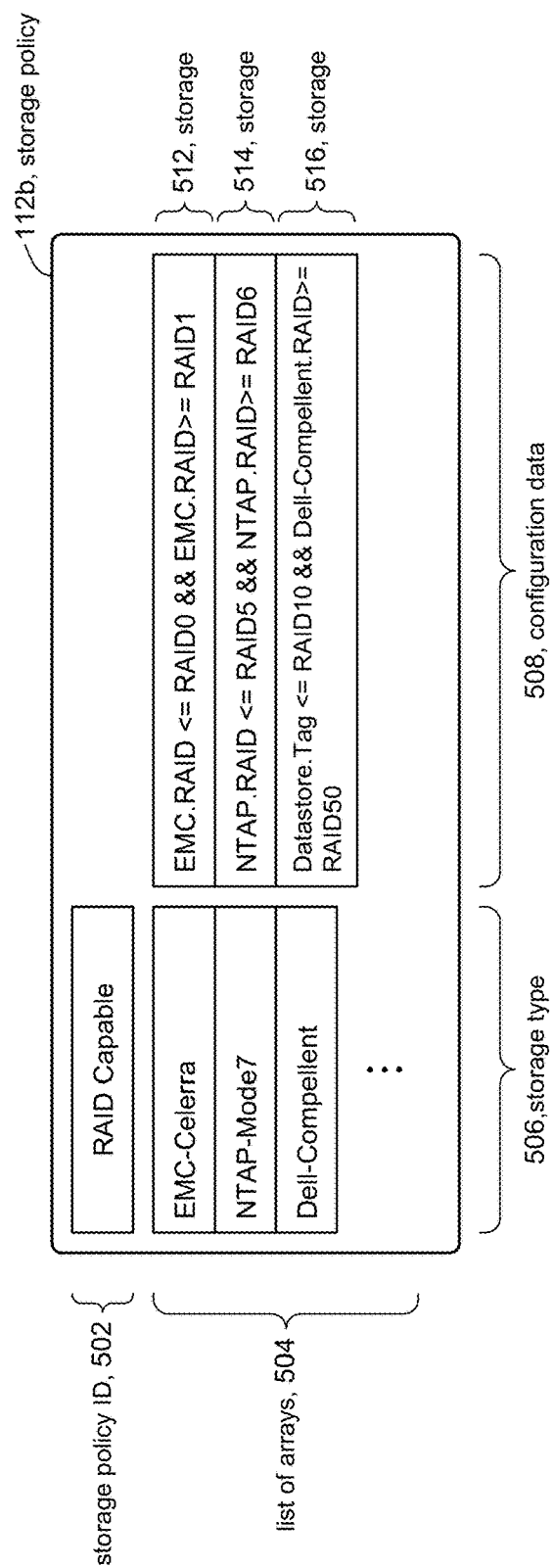

As noted above in connection with block 408, an aspect of the present disclosure is the use of a storage policy 112 to identify a list of candidate datastores. Referring now to FIG. 5, details of a storage policy in accordance with the present disclosure are provided in connection with an illustrative example of storage policy 112a. Each storage policy 112a may represent a storage characteristic. The phrase "storage characteristic" may refer to a certain level of performance, such as a minimum number of IOPs, a range of IOPs, a maximum latency period, minimum data transfer rate, and so on. Storage characteristic may also refer to functionality, such as the ability to compress data, encrypt data, provide data backups, and the like. The functionality may be qualified, for example, encrypt data with a certain level of encryption strength, provide backups with a certain frequency, provide backups with a minimum retention period, and so on. Storage characteristic may refer to a particular configuration; e.g., RAID storage, RAID storage with a given RAID level, SCSI storage, and so on. The storage policy 112a shown in FIG. 5, for example, represents the storage characteristic of guaranteeing a certain range of IOPs. Other storage policies may represent other storage characteristics. FIG. 5A, for example, shows a storage policy 112b that specifies RAID storage.

Storage characteristics and storage policies may be defined by a user (e.g., system administrator). Storage characteristics have a broad range of meanings. For example, the user might decide that datastores that can guarantee a certain minimum IOPs may be useful. The guarantee of a minimum IOPs may become a storage characteristic. As noted above, examples of other storage characteristics include, but are not limited to: a certain level of performance, such as a minimum number of IOPs, a range of IOPs, a maximum latency period, minimum data transfer rate, and so on; functionality, such as the ability to compress data, encrypt data, provide data backups, and the like. The functionality may be qualified, for example, encrypt data with a certain level of encryption strength, provide backups with a certain frequency, provide backups with a minimum retention period, and so on. Storage characteristic may refer to a particular configuration; e.g., RAID storage, RAID storage with a given RAID level, SCSI storage, and so on. Storage characteristics may refer to non-operational aspects of the storage array on which datastores are created; for example, location of the storage array (geographic location, building location, etc.), size of the storage array (e.g., number of disks), cost of operation of the storage array, and so on.

The user may define a storage policy that represents a desired storage characteristic. For example, the user may make entries in the storage policy for one or more storage arrays that can be configured to provide the desired storage characteristic, indicating that datastores created on that storage array may exhibit the desired storage characteristic. The storage arrays identified in the storage policies do not identify to storage arrays that are deployed in the virtualization system, but rather comprises a list of known devices from various storage providers that can be configured in some way (either programmatically or by hardware) to provide the desired storage characteristic. The discussion will now turn to a description of storage policies in accordance with the present disclosure.

Referring to FIG. 5, in accordance with some embodiments, a storage policy 112a may include a policy identifier 502 that identifies the storage policy 112a; a comment field (not shown) may be provided for documentation purposes, for example, to describe the storage characteristic. The policy identifier 502 may be descriptive of the storage characteristic; a comment field (not shown) may be provided for documentation purposes, for example, to describe the storage characteristic and other descriptive information.

The storage policy 112a may comprise a list 504 of storage arrays (e.g., storage arrays 512, 514, 516) on which datastores may be created. Each storage array 512-516 in the list 504 may include a corresponding storage type identifier 506 and corresponding configuration data 508. In accordance with the present disclosure, the list 504 may include storage arrays from different storage providers (e.g., EMC Corporation, NetApp, Inc., Dell, Inc., etc.), different kinds of storage arrays (e.g., SAN, NFS) from the same storage provider, and so on. The storage arrays in list 504 represents storage arrays that can be configured (programmatically or by hardware) to be in compliance with the storage characteristic that the storage policy 112a represents.

The configuration data 508 for a storage array expresses the storage characteristic of the storage policy in terms of how that storage array can be configured to provide the storage characteristic. For example, some storage arrays can be specifically configured to provide the storage characteristic. In the example of FIG. 5, storage array 512 (a particular EMC product) includes a parameter (e.g., EMC.IOPS) that can be configured specifically to provide a given range of IOPs. In some embodiments, the storage array 512 may include an application programming interface (API) that allows the storage array 512 to be accessed by a user; e.g., to configure with the storage array and to query the storage array for information relating to its configuration. Accordingly, the APIs and the configuration data 508 may be used to query the storage array 512 for a particular configuration.

Other storage arrays, though configurable, may not have any configurable parameters specific to the particular storage capability represented by the storage policy. However, the storage array may be configurable to function in a way so as to provide a functionally equivalent storage capability. For example, the user may know that if a particular storage array (e.g., 514, a particular NetApp array) is configured with 5% flash memory, the NetApp array can operate to perform in the range of 8000-10000 IOPs. Thus, although this is not a guarantee, the configuration gives enough flexibility to allow the user to define the NetApp array in a functionally equivalent way to provide 8000-10000 IOPs. In some embodiments, the APIs provided by the storage array and the configuration data 508 may be used to indirectly determine whether the storage array is configured for a given storage characteristic; e.g., a particular storage array (e.g., NetApp array) configured with 5% flash means it can provide 8000-10000 IOPs.

Still other storage arrays (e.g., storage array 516) may have little or no configurable capabilities; for example, there are no well-known capabilities in the Dell Compellant™ array. Nonetheless, in some instances the storage array 516 may be configured in hardware to ensure functionally equivalent storage capability. For example, the user may know that the Dell Compellant™ array may be set up with enough resources (e.g., overprovisioned with flash, hard drives, etc.) so that it can perform in the range of 8000-10000 IOPs. The user may provide information in the configuration data 508 corresponding to storage array 516 that indicates the storage array 516 has been configured in a way so as to provide the given range of IOPs. In some embodiments, for example, the configuration data may be information that is stored in a database (e.g., in the virtualization manager 102, FIG. 1) that can be accessed to determine what storage characteristics the storage array is configured for.

Figure 6:
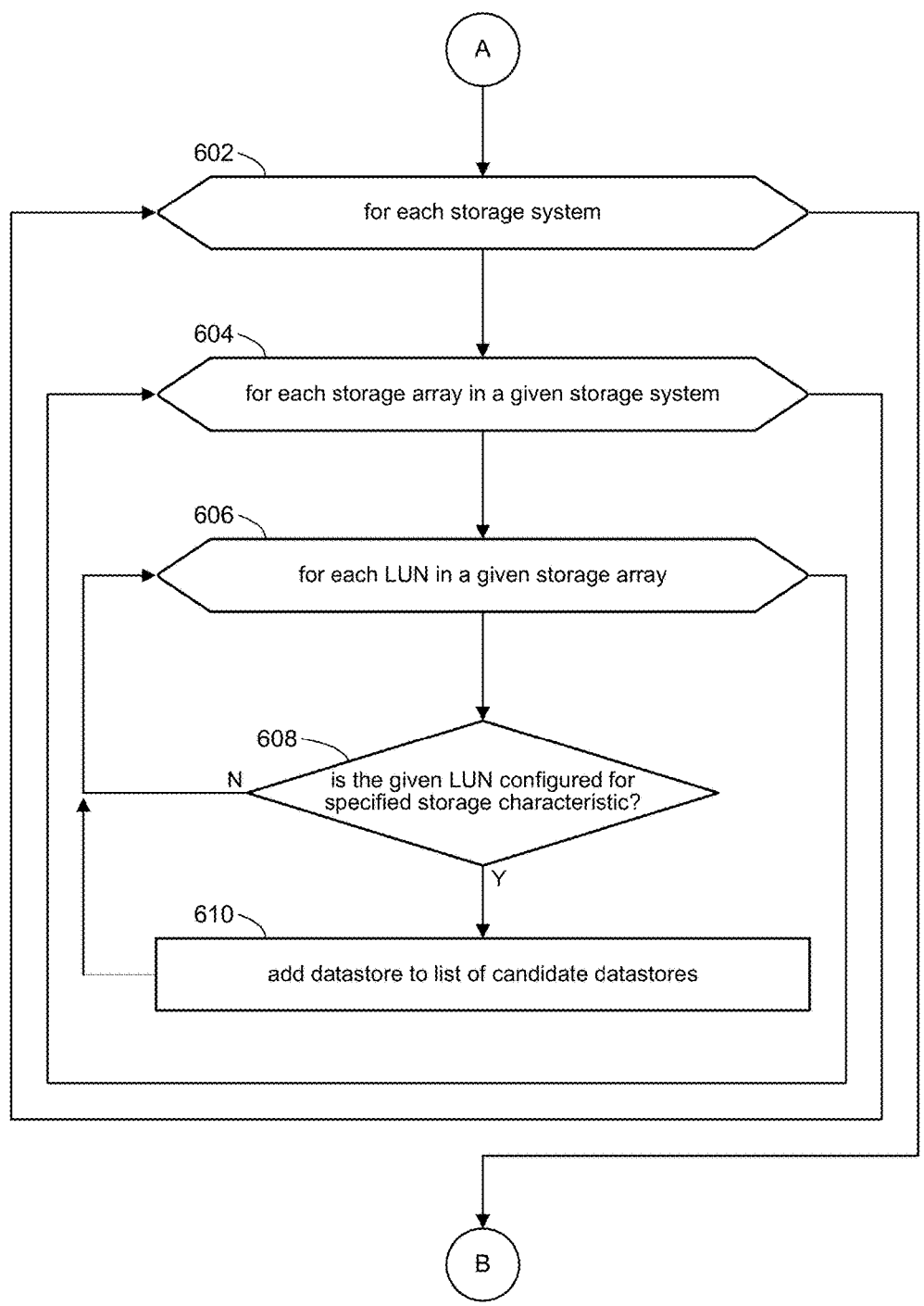
FIG. 6 highlights some aspects of creating a list of candidate datastores.

Referring to FIG. 6, and with reference to FIGS. 3 and 5, the discussion will now turn to a high level description of some heuristics that can serve to represent processing in the configuration manager 122 to identify, in accordance with embodiments of the present disclosure, a list candidate datastores (block 408, FIG. 4) using a selected storage policy (e.g., 112a, FIG. 5). In some embodiments, the configuration manager 122 may identify datastores that are configured with the storage capability specified in the selected storage policy 112a. In some embodiments, for example, the configuration manager 122 may include computer executable program code, which when executed by a computer system (e.g., 202, FIG. 2), may cause the computer system to perform the processing in accordance with FIG. 6. The entry points A and B correspond to entry points A and B shown in FIGS. 4, 8, and 9.

At block 602, the configuration manager 122 (FIG. 3) may produce a list of every storage system 106a, 106b deployed in the virtualization system 100. For example, in some embodiments, the configuration manager 122 may identify the deployed storage systems 106a, 106b from information stored in the virtualization manager 102 (e.g., in a configuration database, or the like). In other embodiments, the configuration manager 122 may access each cluster 104a, 104b in order to identify the storage systems 106a, 106b. For example, each cluster 104a, 104b may have a corresponding cluster manager (not shown) that can provide storage system information to the configuration manager 122. The configuration manager 122 may perform the following for each storage system 106a, 106b that is identified in the virtualization system 100.

At block 604, for each storage array in a given storage system, the configuration manager 122 may determine whether that storage array includes any datastores that are configured to provide the storage characteristic specified by or otherwise associated with the selected storage policy 112a. Recall from above that a given storage array may be partitioned into a plurality of LUNs, and that one or more datastores may created or defined among the LUNs. Accordingly, the storage characteristics attributed to the LUNs can be attributed to the datastore(s) that are defined on them. Thus, the configuration manager 122 may consider each LUN in the storage array to determine whether the datastore(s) on that LUN are configured to provide the storage characteristic. The configuration manager 122 may perform the following for each storage array that is identified the given storage system.

At block 606, for each LUN defined in a given storage array, the configuration manager 122 may consider the LUN to determine if it is configured to provide the specified storage capability in the selected storage policy 112a, which in this example is a guaranteed IOPs of 8000-10000. In some embodiments, information of LUNs defined in the given storage array may be obtained by querying the given storage array (e.g., via suitable APIs). In other embodiments, the virtualization system 100 ma include a configuration database (not shown) that contains the information, and so on. The configuration manager 122 may perform the following for each LUN that is identified the given storage array.

At block 608, the configuration manager 122 may use the configuration data 508 in the storage policy 112a to determine if a given LUN in the storage array is configured to provide the specified storage capability (in this example, a guaranteed IOPs of 8000-10000). In some embodiments, the storage array may expose one or more APIs that allow the configuration manager 122 to make function calls into the storage array to determine (e.g., using the string "EMC.IOPS<=10000 && EMC.IOPS>=8000") if a LUN in the storage array is configured for the specified storage characteristic. In other embodiments, where the storage array may not expose suitable APIs to allow for the determination to be made, configuration information for each LUN may be stored and managed; e.g., in a database associated with the storage array or with the cluster (e.g., 104a), to which the storage array is connected, etc. The configuration manager 122 may query such a database using the configuration data 508 to determine if a given LUN is configured to provide the specified storage characteristic. It can be appreciated that the heuristics for determining whether the LUN is configured to provide the specified storage capability will vary depending on how the configuration information is accessed, whether by APIs, databases, or other methods for managing configuration data.

If the given LUN does not match the configuration data 508 (NO branch), then the configuration manager 122 may simply loop back to block 606 to process the next LUN in the given storage array. If the given LUN does match the configuration data 508 (YES branch of block 608), the datastores created on the given LUN may be deemed to be compliant with the specified storage characteristic. Accordingly, at block 610 the configuration manager 122 may include the datastores created on that LUN to the list of candidate datastores and loop back to block 606 to consider the next LUN in the given storage array.

When all the LUNs in the given storage array have been considered, the configuration manager 122 may loop back to block 604 to process the next storage array in the given storage system. When all the storage arrays in the given storage system have been considered, the configuration manager 122 may loop back to block 602 to process the next storage system in the virtualization system 100. When all the storage systems have been considered, the resulting list of candidate datastores may include zero or more datastores that are deemed to be able to provide the storage capability specified for the given storage policy 112a, either because they are programmatically configured to provide the storage capability or otherwise physically configured (e.g., overprovisioned with hardware) to function in a way that can provide capability equivalent to the specified storage capability. Processing may proceed to exit point B with the selected datastore, and continue at the appropriate Referring to FIG. 7, and with reference to FIG. 3, the discussion will now turn to a high level description of some heuristics that can serve to represent processing in the configuration manager 122, in accordance with embodiments of the present disclosure, to select a datastore (block 424, FIG. 4) from among the candidate datastores identified in block 408. In some embodiments, for example, the configuration manager 122 may include computer executable program code, which when executed by a computer system (e.g., 202, FIG. 2), may cause the computer system to perform the processing in accordance with FIG. 7. The entry points C and D correspond to entry points C and D shown in FIGS. 4, 8, and 9.

At block 702, the configuration manager 122 may filter the list of candidate datastores for accessibility. For example, in some configurations, in order for the VM to access the datastore, the VM and datastore may be required to be in the same cluster. In other configurations, the VM and datastore may be required to be on the same host. For example, a VM provisioned on host 142b (cluster 104a) may not have access to datastore 108d on cluster 104b. In such cases, datastores that do not have a cluster or host in common with the VM can be removed from the list of candidate datastores. If the list of candidate datastores is empty, the configuration manager 122 may send or otherwise raise an alert to notify the user.

At block 704, the configuration manager 122 may filter the remaining list of candidate datastores based on storage capacity. For example, a datastore needs to have sufficient storage capacity to accommodate the required capacity of the datastore (e.g., in order to define a virtual disk on the datastore). Datastores that do not have sufficient capacity can be removed from the list of candidate datastores. If the list of candidate datastores is empty, the configuration manager 122 may send a notification or otherwise raise an alert to notify the user.

At block 706, the configuration manager 122 may filter the remaining list of candidate datastores based on I/O bandwidth. At this point, the list of candidate datastores should comprise datastores that can be accessed by the VM and have sufficient capacity to accommodate the storage requirements of the datastore. In some embodiments, the remaining list of candidate datastores may be ordered or ranked according to their available I/O bandwidth. A measure of I/O bandwidth, for example, may be the number of VMs associated with the datastore from which to create the candidate datastore. I/O bandwidth may be based on the total number of IOPs processed by the datastore, and so on. The list of candidate datastores may be ranked from lowest I/O bandwidth (indicates low level of I/O activity) to the highest I/O bandwidth (indicates high level of I/O activity). The configuration manager 122 may remove some predetermined number n of the lowest ranked datastores from the list of candidate datastore, thus further reducing the list of candidate datastores.

At block 708, the configuration manager 122 may filter the remaining list of candidate datastores based on operational metrics of the datastores that are deemed relevant to the storage characteristics defined by the storage policy. For example, the configuration manager 122 may use the storage characteristic to identify one more operational metrics. Operational metrics may include real-time data representing aspects of the operation of a datastore. Operational metrics, for example, may include statistics (average, min., max., etc.) relating to access latency times, size of data written by the datastore, data write speed, number of I/O requests, and so on. In accordance with the present disclosure, the configuration manager 122 may select one or more of these operational metrics that are relevant to the storage characteristic. In some embodiments, for example, a predetermined map (not shown) may provide a mapping between a given storage characteristic and one or more operational metrics that are deemed relevant to the given storage characteristic. For example, when a user (e.g., system administrator) defines a storage characteristic, they may decide which operational metrics are relevant to that storage characteristic. For instance, if the storage characteristic is guaranteed IOPs, I/O latency of the datastore may be deemed a relevant operational metric. Operational metrics may include configuration information. For example, if the storage characteristic is encryption capability, whether the datastore is configured with supporting hardware to perform the encryption may be deemed an operational metric, and so on.

At block 710, the configuration manager 122 may use the selected operational metric(s) to rank the datastores in the remaining list of candidate datastores. The configuration manager 122 may select the datastore having the best ranking. For example, if the operational metric is latency time, the datastores may be ranked from the shortest latency time to the longest latency time. The datastore with the shortest latency time may then be selected. Processing may proceed to exit point D with the selected datastore, and continue at the appropriate points in FIGS. 4, 8, and 9.

Figure 8:
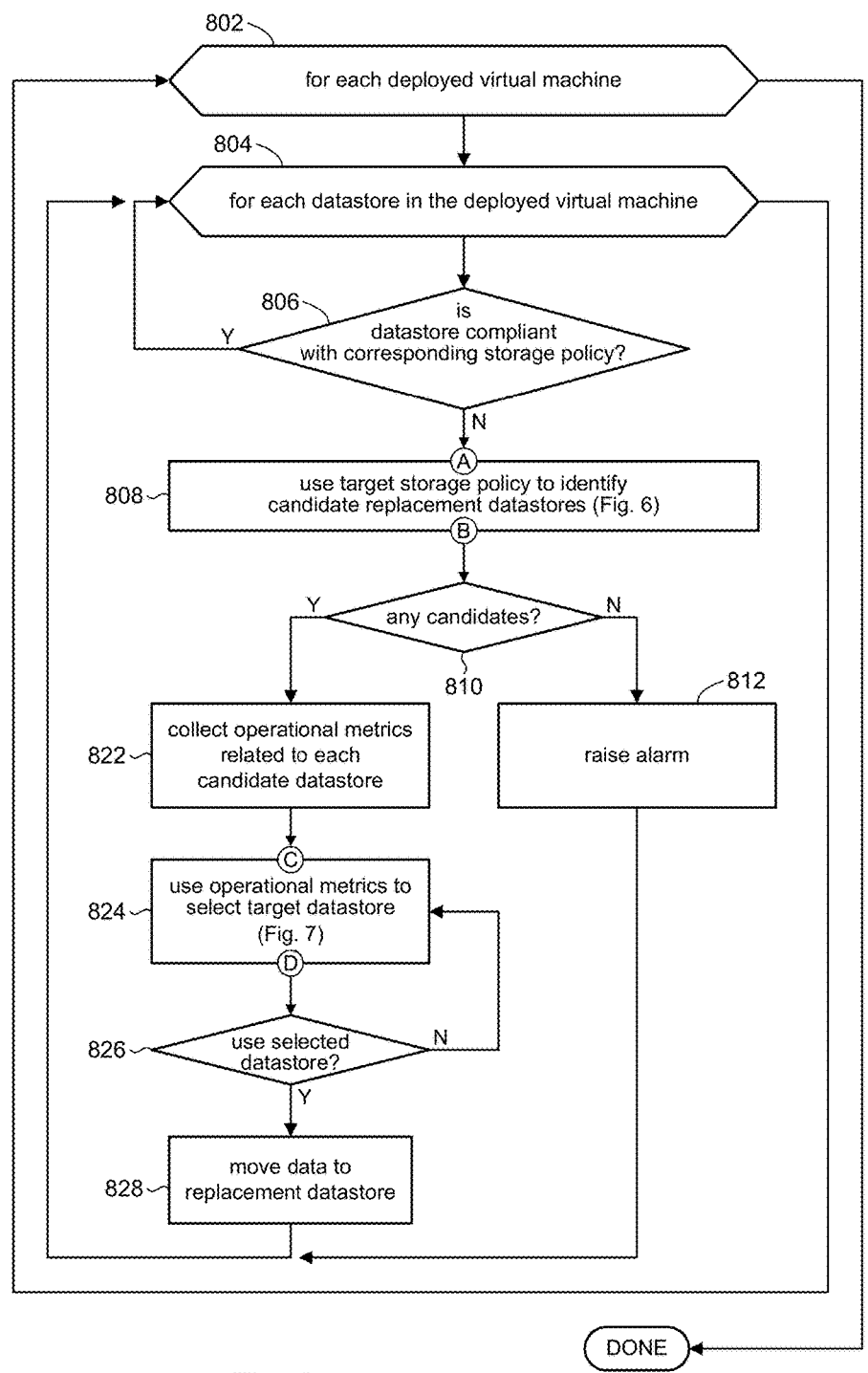
FIG. 8 highlights some aspects of monitoring in a virtualization system in accordance with the present disclosure.

Deployed VMs provisioned in accordance with the present disclosure may be monitored to ensure their datastores maintain compliance in accordance with the storage policies used to specify them. Referring to FIG. 8, the discussion will now turn to a high level description of some heuristics that can serve to represent processing in the storage monitor 124 (FIG. 1) to monitor the performance of datastores in accordance with the present disclosure. In some embodiments, for example, the storage monitor 124 may include computer executable program code, which when executed by a computer system (e.g., 202, FIG. 2), may cause the computer system to perform the processing in accordance with FIG. 8. The storage monitor 124 may execute as a background process in autonomous fashion. In some embodiments, the storage monitor 124 may continuously execute as a background process. In other embodiments, the virtualization manager 102 may periodically invoke the storage monitor 124 according to a schedule. In some embodiments, the storage monitor 124 may be manually invoked by a user (e.g., system administrator).

At block 802, the storage monitor 124 may monitor each VM deployed in the virtualization system 100. At block 804, the storage monitor 124 may monitor each datastore deployed on that VM.

At block 806, the storage monitor 124 may assess a given datastore deployed in a given VM to determine whether the datastore is in compliance with the storage characteristics defined by the storage policy used to select the datastore. For example, the storage monitor 124 may use operational metrics collected for the LUN on which the datastore is created, or the storage array on which the LUN is defined, and so on. The storage monitor 124 may compare the operational metrics with the storage characteristic of the storage policy. If the datastore is functioning in accordance with the storage characteristics, the storage monitor 124 may loop back to block 804 to consider the next datastore (if any) that is deployed in the given VM. If the datastore is not functioning in accordance with the storage characteristics, the storage monitor 124 may proceed to block 808 to use the storage policy that was used to identify the non-compliant datastore as a target storage policy to identify a replacement datastore.

At block 808, the storage monitor 124 may use the target storage policy to identify a list of candidate datastores from among the datastores deployed in the virtualization system 100, high level details for which are explained in FIG. 6 in connection with processing in the configuration manager 122.

At block 810, if no candidate datastores are found (NO branch), the storage monitor 124 may raise an alarm or other notification, at block 812, to warn a user (e.g., system administrator) that a non-compliant datastore has been detected and that a replacement datastore cannot be identified. The user may ignore the notification, or take appropriate action. The storage monitor 124 may loop back to block 804 to consider the next datastore (if any) that is deployed in the given VM.

At block 810, if one or more candidate datastores are found (YES branch), the storage monitor 124 may select one of the candidate datastores in order to replace the non-compliant datastore (block 828). Accordingly, at block 822, in accordance with the present disclosure, the storage monitor 124 may collect operational metrics relating to the performance for each datastore in the list of candidate datastores identified at block 808.

Figure 7:
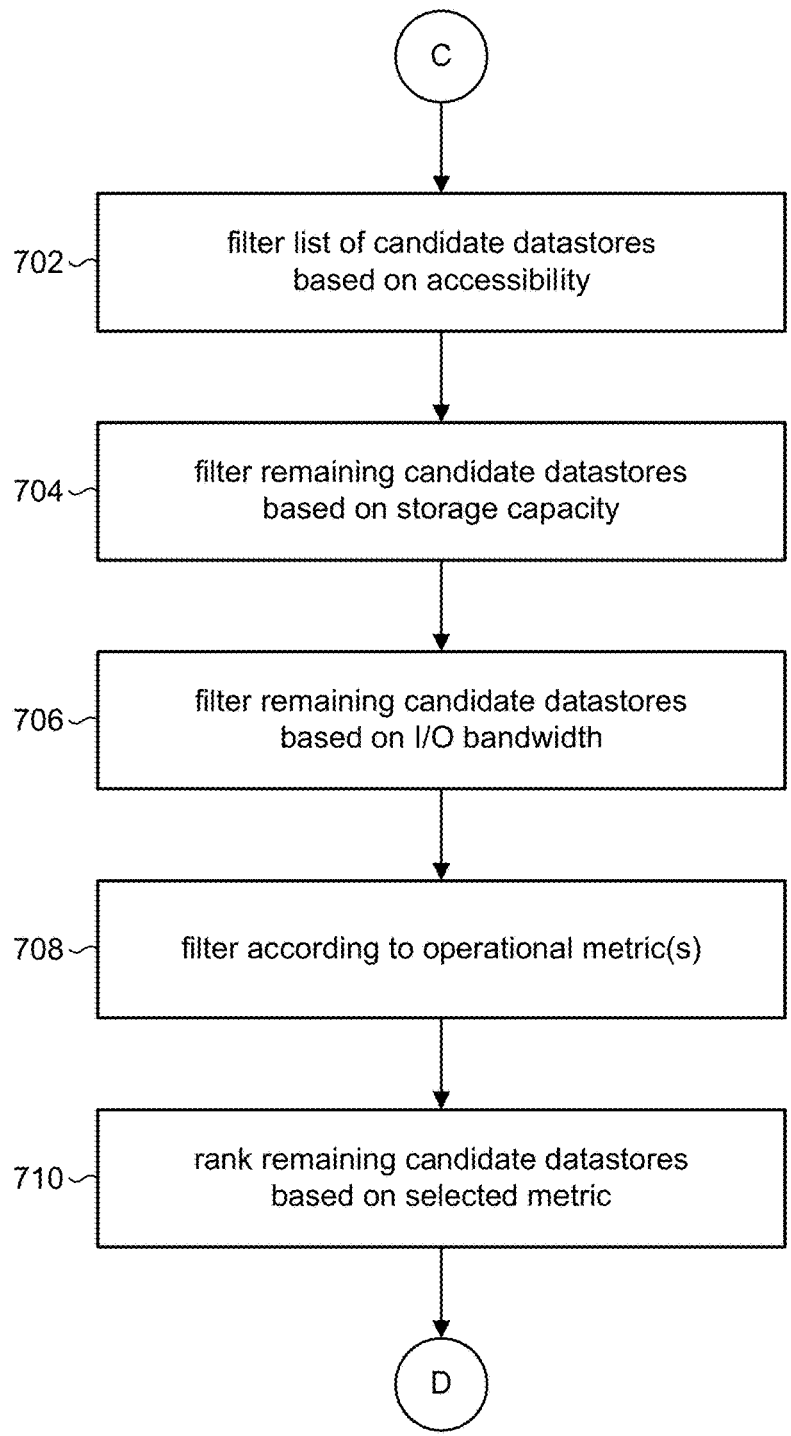
FIG. 7 highlights some aspects of selecting a datastore from a list of candidate datastores.

At block 824, the storage monitor 124 may identify a replacement datastore from among the candidate datastores using the operational metrics collected at block 822, high level details for which are explained in FIG. 7 in connection with processing in the configuration manager 122.

At block 826, the storage monitor 124 may notify the user that a replacement datastore is being proposed. This allows the user to make the final decision whether to proceed with the replacement (YES branch) or not (NO branch). If the proposal is denied, the storage monitor 124 may make another selection (repeat block 824) from among the candidate datastores. If the proposal is accepted, processing may proceed to block 828.

At block 828, the storage monitor 124 may provision the VM with the new datastore, including copying or moving data from the existing (old) datastore on the non-compliant storage array over to the new datastore. The old datastore may be then be removed from the VM. The storage monitor 124 may then loop back to block 804 to consider the next datastore (if any) that is deployed in the given VM. When all the datastores in the given VM have been considered, the storage monitor 124 may loop back to block 802 to consider the next deployed VM in the virtualization system 100.

Figure 9:
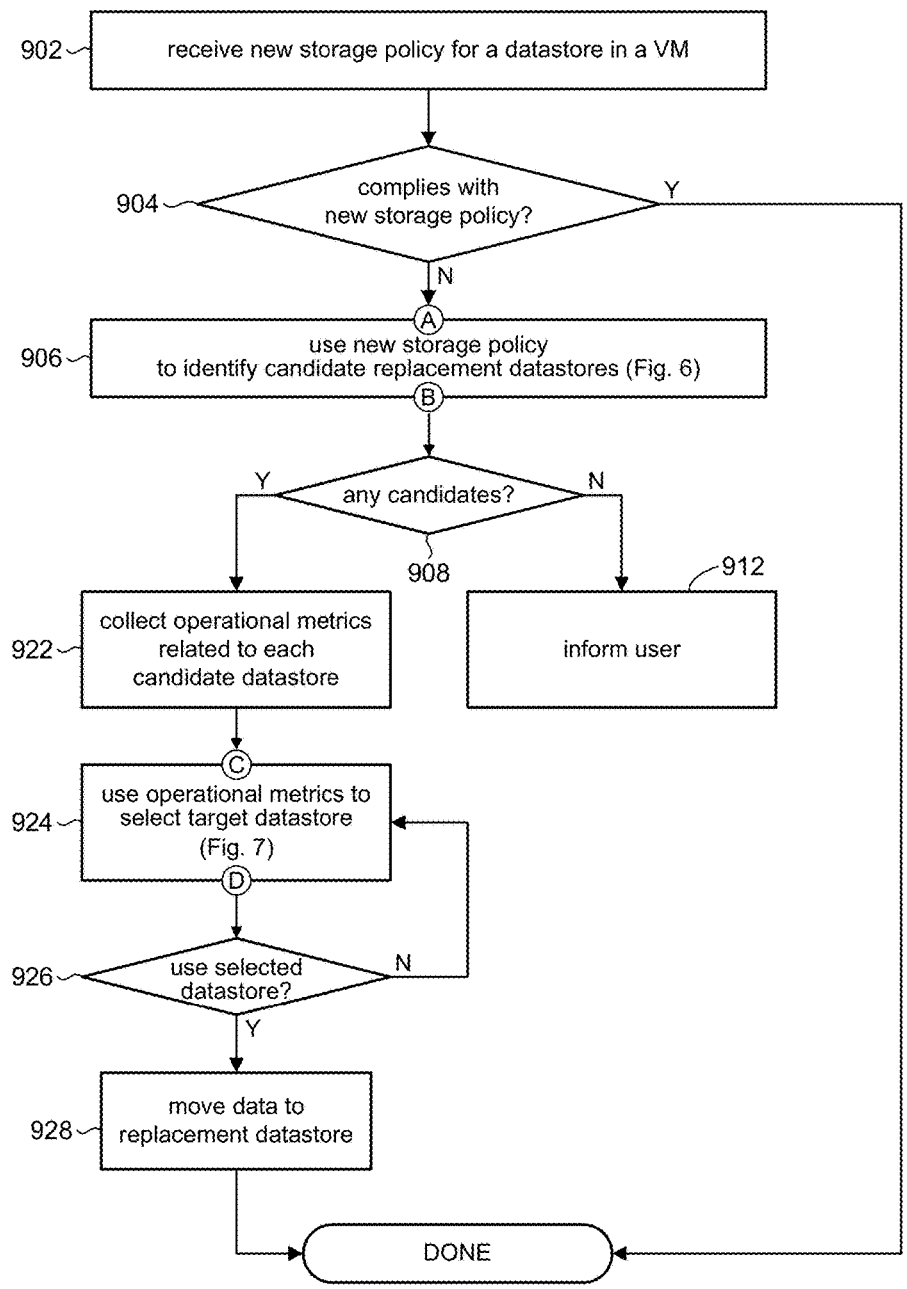
FIG. 9 highlights some aspects of changing the storage characteristics of a deployed datastore in accordance with the present disclosure.

In some embodiments, the configuration manager 122 (FIG. 1) may be further configured to allow a user (e.g., system administrator) to change the storage characteristics of a datastore created in accordance with the present disclosure. Referring to FIG. 9, the discussion will now turn to a high level description of some heuristics that can serve to represent processing in the configuration manager 122 to change the storage characteristic of a datastore in accordance with the present disclosure. In some embodiments, for example, the configuration manager 122 may include computer executable program code, which when executed by a computer system (e.g., 202, FIG. 2), may cause the computer system to perform the processing in accordance with FIG. 9.

At block 902, the configuration manager 122 may receive input from a user to change the storage characteristic of a datastore. In accordance with the present disclosure, the configuration manager 122 may receive a new storage policy from the user in order to select a new datastore having the storage characteristic defined by the new storage policy.

At block 904, the configuration manager 122 may assess the current datastore to determine if it already is in compliance with the storage characteristic defined by the new storage policy. If the current datastore is compliant, the configuration manager 122 may retain the current datastore instead of identifying a replacement datastore. This can avoid unnecessary moving of data. If the current datastore is non-compliant, the configuration manager 122 may identify a replacement datastore.

At block 906, the configuration manager 122 may use the new storage policy to identify a list of candidate datastores from among the datastores deployed in the virtualization system 100, high level details for which are explained in FIG. 7.

At block 908, if no candidate datastores are found, the configuration manager 122 may alert the user at block 912. The user may take appropriate action. The user may select another storage policy, or attempt to manually identify a datastore.

At block 908, if one or more candidate datastores are found, the configuration manager 122 may select one of the candidate datastores in order to replace the current datastore (block 928). Accordingly, at block 922, in accordance with the present disclosure, the configuration manager 122 may collect operational metrics relating to the performance for each datastore in the list of candidate datastores identified at block 906.

At block 924, the configuration manager 122 may identify a replacement datastore from among the candidate datastores using the operational metrics collected at block 922, high level details for which are explained in FIG. 7.

At block 926, the configuration manager 122 may notify the user of a proposed replacement datastore. This allows the user to make the final decision whether to proceed with the replacement (YES branch) or not (NO branch). If the proposal is denied, the configuration manager 122 may make another selection (repeat block 924) from among the candidate datastores. If the proposal is accepted, processing may proceed to block 928.

At block 928, the configuration manager 122 may provision the VM with the new datastore, including copying or moving data from the current (old) datastore on the current storage array over to the new datastore. The old datastore may be then be removed from the VM.

As explained above, storage policies in accordance with the present disclosure represent a storage characteristic. The storage policy may be used to describe a storage characteristic desired in a datastore, whether this is done during provisioning of a VM or post-provisioning on a deployed VM. The virtualization system 100 (e.g., via the configuration manager 122 or storage monitor 124) may use the storage policy to autonomously identify a suitable datastore, as opposed to having a user (e.g., system administrator) perform the potentially tedious task. In some embodiments, the storage policy identifies specific storage arrays that can be configured to provide the storage characteristic defined by the storage policy to provide functionality that is equivalent to the defined storage characteristic.

In other embodiments, the storage policy may also define storage characteristics in terms of services, capabilities, or other characteristics exposed by hosts (host characteristics) and switches (switch characteristics). In accordance with the present disclosure, any aspect of the host may serve as a host characteristic. Examples to illustrate this point, include but are not limited to factors such as hardware configuration of the host (e.g., memory, CPU, networking, etc.), capacity in the host (e.g., number of deployed VMs, etc.), location of the host (e.g., geographic location, location in a building, etc.), connectivity (e.g., with other hosts, with switches, types of connections, etc.), and so on. Likewise, any aspect of the switch (network) may serves as a switch characteristic.

Examples to illustrate this point, include but are not limited to factors such as configuration of the switch, interfaces to the switch, functions supported by the switch, and so on.

The various embodiments described herein may employ various computer-implemented operations involving data stored in computer systems. For example, these operations may require physical manipulation of physical quantities. Usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

One or more embodiments may be implemented as one or more computer programs or as one or more computer program modules embodied in one or more computer readable storage media. The term computer readable storage medium refers to any data storage device that can store data which can thereafter be input to a computer system— computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a virtualization system comprising:
monitoring storage performance in a plurality of deployed VMs in the virtualization system including monitoring a target virtual machine (VM);
in response to a given datastore associated with the target VM no longer being in compliance with a storage policy used to identify the given datastore, using the storage policy as a target storage policy to identify a target datastore as a replacement datastore to replace the given datastore, the target storage policy specifying at least one storage characteristic that characterizes the target datastore;
using the target storage policy to identify, absent any user input, a plurality of candidate datastores from among a plurality of datastores that are deployed in the virtualization system, each candidate datastore having a configuration that is compliant with the at least one storage characteristic specified in the target storage policy;
selecting, absent any user input, one of the candidate datastores from among the plurality of candidate datastores as the target datastore;
associating the target datastore with the target VM; and
copying data from the given datastore to the replacement datastore.

2. The method of claim 1, wherein the plurality of datastores deployed in the virtualization system are created on storage arrays, wherein the target storage policy identifies a plurality of storage array types and corresponding configuration data for each storage array type, the configuration data indicative of how the corresponding type of a given storage array can be configured to comply with the at least one storage characteristic.

3. The method of claim 2, further comprising using the configuration data in the target storage policy to identify the plurality of candidate datastores.

4. The method of claim 1, wherein selecting the target datastore from among the plurality of candidate datastores includes retrieving metrics from the virtualization system for each candidate datastore that relate to operation of the candidate datastore and selecting the target datastore from among the plurality of candidate datastores based on their respective metrics.

5. The method of claim 1, wherein the candidate datastores are connected to one or more corresponding host machines, wherein the target storage policy includes at least one host machine characteristic, wherein each of the plurality of candidate datastores is connected to a host machine that provides the at least one host machine characteristic.

6. The method of claim 1, wherein the candidate datastores are connected to one or more corresponding host machines via one or more corresponding switches, wherein the target storage policy includes at least one switch characteristic, wherein each of the plurality of candidate datastores is connected to a switch that provides the at least one switch characteristic.

7. The method of claim 1, further comprising provisioning the target VM, including specifying a datastore for the target VM by selecting a storage policy from among a plurality of storage policies, wherein the selected storage policy is the target storage policy.

8. A non-transitory computer-readable storage medium having stored thereon computer executable instructions, which when executed by a computer device, cause the computer device to:
monitor storage performance in a plurality of deployed VMs in the virtualization system including monitoring a target virtual machine (VM);
in response to a given datastore associated with the target VM no longer being in compliance with a storage policy used to identify the given datastore, use the storage policy as a target storage policy to identify a target datastore as a replacement datastore to replace the given datastore, the target storage policy specifying at least one storage characteristic that characterizes the target datastore;
use the target storage policy to identify, absent any user input, a plurality of candidate datastores from among a plurality of datastores that are deployed in the virtualization system, each candidate datastore having a configuration that is compliant with the at least one storage characteristic specified in the target storage policy;
select, absent any user input, the target datastore from among the plurality of candidate datastores as the target datastore;
associate the target datastore with the target VM; and
copy data from the given datastore to the replacement datastore.

9. The non-transitory computer-readable storage medium of claim 8, wherein the plurality of datastores deployed in the virtualization system are created on storage arrays, wherein the target storage policy identifies a plurality of storage array types and corresponding configuration data for each storage array type, the configuration data indicative of how the corresponding type of a given storage array can be configured to comply with the at least one storage characteristic.

10. The non-transitory computer-readable storage medium of claim 9, wherein the computer executable instructions, which when executed by a computer device, further cause the computer device to use the configuration data in the target storage policy to identify the plurality of candidate datastores.

11. The non-transitory computer-readable storage medium of claim 8, wherein when the computer device selects the target datastore from among the plurality of candidate datastores, the computer device retrieves metrics from the virtualization system for each candidate datastore that relate to operation of the candidate datastore and selects the target datastore from among the plurality of candidate datastores based on their respective metrics.

12. The non-transitory computer-readable storage medium of claim 8, wherein the candidate datastores are connected to one or more corresponding host machines, wherein the target storage policy includes at least one host machine characteristic, wherein each of the plurality of candidate datastores is connected to a host machine that provides the at least one host machine characteristic.

13. An apparatus comprising:
one or more computer processors; and
a computer-readable storage medium comprising instructions for controlling the one or more computer processors to be operable to:
monitor storage performance in a plurality of deployed VMs in the virtualization system including monitoring a target virtual machine (VM);
in response to a given datastore associated with the target VM no longer being in compliance with a storage policy used to identify the given datastore, use the storage policy as a target storage policy to identify a target datastore as a replacement datastore to replace the given datastore, the target storage policy specifying at least one storage characteristic that characterizes the target datastore;
use the target storage policy to identify, absent any user input, a plurality of candidate datastores from among a plurality of datastores that are deployed in the virtualization machine environment, each candidate datastore having a configuration that is compliant with the at least one storage characteristic specified in the target storage policy;
select, absent any user input, one of the candidate datastores from among the plurality of candidate datastores as the target datastore;
associate the target datastore with the VM; and
copy data from the given datastore to the replacement datastore.

14. The apparatus of claim 13, wherein the plurality of datastores deployed in the virtualization system are created on storage arrays, wherein the target storage policy identifies a plurality of storage array types and corresponding configuration data for each storage array type, the configuration data indicative of how the corresponding type of a given storage array can be configured to comply with the at least one storage characteristic.

15. The apparatus of claim 14, wherein the computer executable instructions, which when executed by a computer device, further cause the computer device to use the configuration data in the target storage policy to identify the plurality of candidate datastores.

16. The apparatus of claim 13, wherein when the one or more computer processors select the target datastore from among the plurality of candidate datastores, the one or more computer processors retrieve metrics from the virtualization system for each candidate datastore that relate to operation of the candidate datastore and select the target datastore from among the plurality of candidate datastores based on their respective metrics.

17. The apparatus of claim 13, wherein the candidate datastores are connected to one or more corresponding host machines, wherein the target storage policy includes at least one host machine characteristic, wherein each of the plurality of candidate datastores is connected to a host machine that provides the at least one host machine characteristic.

18. A method in a virtualization system comprising:
in a given datastore associated with a target virtual machine (VM), changing a first storage policy used to identify the given datastore to a second storage policy; and
using the second storage policy as a target storage policy to identify a target datastore as a replacement datastore to replace the given datastore, the target storage policy specifying at least one storage characteristic that characterizes the target datastore, including:
  using the target storage policy to identify, absent any user input, a plurality of candidate datastores from among a plurality of datastores that are deployed in the virtualization system, each candidate datastore having a configuration that is compliant with the at least one storage characteristic specified in the target storage policy;
  selecting, absent any user input, one of the candidate datastores from among the plurality of candidate datastores as the target datastore;
  associating the target datastore with the target VM; and
  copying data from the given datastore to the replacement datastore.

19. The method of claim 18, wherein the plurality of datastores deployed in the virtualization system are created on storage arrays, wherein the target storage policy identifies a plurality of storage array types and corresponding configuration data for each storage array type, the configuration data indicative of how the corresponding type of a given storage array can be configured to comply with the at least one storage characteristic.

20. The method of claim 19, further comprising using the configuration data in the target storage policy to identify the plurality of candidate datastores.

21. The method of claim 18, wherein selecting the target datastore from among the plurality of candidate datastores includes retrieving metrics from the virtualization system for each candidate datastore that relate to operation of the candidate datastore and selecting the target datastore from among the plurality of candidate datastores based on their respective metrics.

22. The method of claim 18, wherein the candidate datastores are connected to one or more corresponding host machines, wherein the target storage policy includes at least one host machine characteristic, wherein each of the plurality of candidate datastores is connected to a host machine that provides the at least one host machine characteristic.

23. The method of claim 18, wherein the candidate datastores are connected to one or more corresponding host machines via one or more corresponding switches, wherein the target storage policy includes at least one switch characteristic, wherein each of the plurality of candidate datastores is connected to a switch that provides the at least one switch characteristic.

24. The method of claim 18, further comprising provisioning the target VM, including specifying a datastore for the target VM by selecting a storage policy from among a plurality of storage policies, wherein the selected storage policy is the target storage policy.

* * * * *